MESSAGE DISPLAY AND TRANSMISSION SYSTEM UTILIZING MAGNETIC STORAGE DRUM HAVING TRACK WITH MESSAGE ZONE FOR STORING BINARY-ENCODED WORD AND DISPLAY ZONES FOR STORING CORRESPONDING BINARY DISPLAY MATRIX

Filed July 25, 1960 3 Sheets-Sheet 1

INVENTOR
GENE M. AMDAHL
BY HIS ATTORNEYS
HARRIS, KIECH, RUSSELL & KERN

MESSAGE DISPLAY AND TRANSMISSION SYSTEM UTILIZING MAGNETIC STORAGE DRUM HAVING TRACK WITH MESSAGE ZONE FOR STORING BINARY-ENCODED WORD AND DISPLAY ZONES FOR STORING CORRESPONDING BINARY DISPLAY MATRIX

Filed July 25, 1960 3 Sheets-Sheet 2

INVENTOR
GENE M. AMDAHL
BY HIS ATTORNEYS
HARRIS, KIECH, RUSSELL & KERN

INVENTOR
GENE M. AMDAHL
BY HIS ATTORNEYS
HARRIS, KIECH, RUSSELL & KERN 3,241,120
Patented Mar. 15, 1966

3,241,120

MESSAGE DISPLAY AND TRANSMISSION SYSTEM UTILIZING MAGNETIC STORAGE DRUM HAVING TRACK WITH MESSAGE ZONE FOR STORING BINARY-ENCODED WORD AND DISPLAY ZONES FOR STORING CORRESPONDING BINARY DISPLAY MATRIX

Gene M. Amdahl, Newport Beach, Calif., assignor to Ford Motor Company, Dearborn, Mich., a corporation of Delaware Filed July 25, 1960, Ser. No. 45,203
10 Claims. (Cl. 340—172.5)

This invention relates to data handling systems and, in particular, to systems wherein the data is displayed for visual inspection.

In the present system, a message may be composed by an operator or other input source, displayed for visual inspection, and then supplied to an output line for transmission. The message may be corrected after visual inspection and prior to transmission; also corrections can be made at any point in the message without necessitating recomposition of the entire message.

It is an object of the invention to provide a data handling system which can compose messages in the form of symbols, usually alpha-numeric characters, with the message composition being performed by means of a keyboard or other manually operated means or by signals from a remote source, either analog or digital in nature. A further object is to provide such a system wherein the format of the message may be controlled by preset information so that the input data will be entered into the message form at specified locations. A further object is to provide a system wherein the message format can be changed by selecting one of a number of preset forms.

The system incorporates means for pictorially displaying a message or other data for visual inspection. The data is stored on a magnetic drum with each storage spot on the drum having a corresponding spot on the display. The data can be removed from and inserted onto the drum to change the display.

*Summary*

The present invention provides a message display system including a source of input data in binary word form, message storage means for storing the binary words, message transmission means for transmitting the binary words from the storage means to an output line, a visual display unit, control means for actuating the display unit to display a pattern thereon, a symbol storage having a plurality of symbols stored therein with each stored symbol having a pattern of ones and zeros which pictorially defines the symbol, and with each stored symbol having a corresponding binary word, means for comparing an input binary word with the symbol storage binary words to select a particular symbol pattern, means for transferring the selected symbol pattern to the visual display unit, and means for actuating the message transmission means to transmit the data from the message storage means. In the present system any particular piece of data can be removed from the storage means and a new piece substituted therefor without disturbing the remainder of the stored data.

The present invention also provides a message display system including a source of input data in binary word form, a storage drum having a display track, message storage means for storing of binary words, message transmission means for transmitting the binary words from the storage to an output line, a display tube with horizontal and vertical sweep and beam intensity control, a symbol storage with each stored symbol having a corresponding binary word, means for comparing the input binary word with the symbol storage binary words to select a particular symbol matrix, means for transferring the selected symbol matrix to the display track of the storage drum at a predetermined location, and means for connecting the display track to the beam intensity control for displaying the selected symbol on the tube. The display track of the storage drum may have a message storage zone and a plurality of display zones with the message storage zone providing for storage of the message in binary word form. Symbol storage may be in the form of a storage track on the storage drum. The system may include a marker track on the storage drum with the location of the stored symbol in the symbol track and the location of the character position of the display in which the symbol is to be displayed carried in the marker track for extracting a selected symbol from the storage track and inserting the extracted symbol into the display zones of the display track.

*Drawings*

*Function of system*

In the preferred form illustrated herein, the message display system of the invention provides accurate and rapid composition of a message for transmission over a communication line or to a computer or for any other ultimate use. An operator may compose the message from a keyboard and as he types, the message is pictorially display for visual inspection by the operator. A visual marker may be automatically display to indicate where the next character will be positioned. If the operator makes an error in composing the message, he may backspace to the position where the error occurred, insert the correct symbol, and then shift to the position where the message composition was interrupted. The completed message can be visually checked and corrections or changes can be made at this time. When the message is satisfactory, the transmission equipment is actuated and the message is sent to the desired location.

Figure 1:
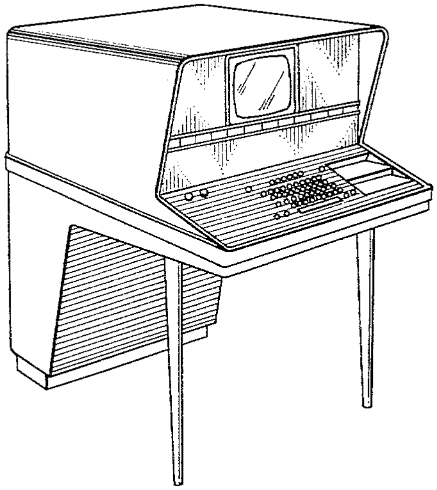
FIG. 1 is an isometric view of a preferred form of the invention.

*FIG. 1.—Description of console*

A typical operating console for the message display system is illustrated in FIG. 1. The equipment is contained in a housing 10 with a keyboard 11, which may be similar to a typewriter or teletype keyboard, positioned for actuation by the operator. A display unit in the form of a cathode ray tube 12 is mounted in the housing above the keyboard.

Figure 2:
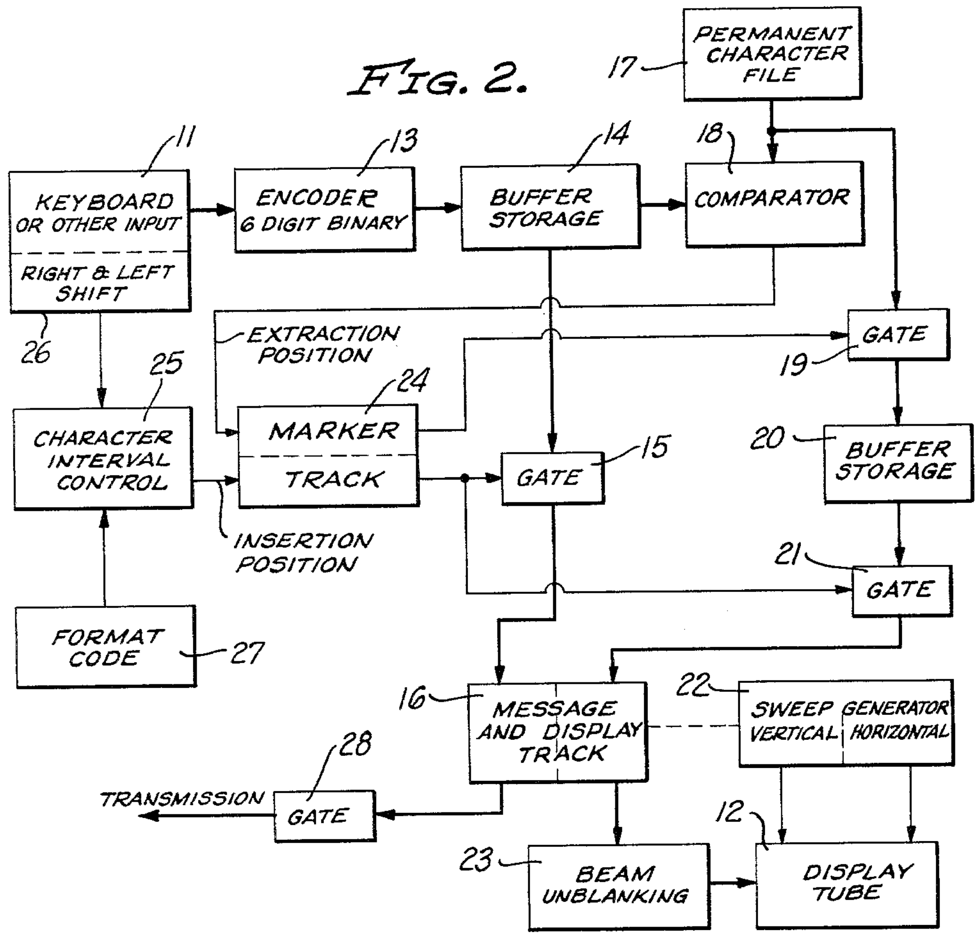
FIG. 2 is a block diagram of the message display system.

*FIG. 2.—General description of system*

In the diagram of FIG. 2, the movement of data through the system is indicated by the heavy solid lines and the movement of control signals is indicated by the light solid lines. Each character signal generated at the keyboard 11 is converted into a binary-encoded signal in an encoder 13. The binary-encoded signal passes through a buffer storage unit 14 and a gate 15 to a message zone of a message and display track 16 on a storage drum. The encoded signal is also converted to a matrix binary numbers which are graphically representative of the character. Each line of the matrix is stored in sequential form on display zones of the message and display track 16. Translation of the input signal to such a matrix is accomplished by comparing the encoded input signal with each member of a library of identifying words from a permanent character file 17 in a comparator 18 and inserting an appropriate matrix from the permanent character file 17 via a gate 19, a buffer storage unit 20, and a gate 21 to the display track 16. The horizontal and vertical deflection signals from the sweep generator 22 are operated in synchronism with the storage drum which carries the message and display track 16 so that there is a direct correspondence between each position on the display track and each spot on the display tube. The intensity of the beam in the display tube is controlled by a beam unblanking unit 23 which is energized from the display track to provide a direct relation between the ones and zeros of the matrix stored in the display track and the light and dark zones on the display tube.

Extraction of the particular matrix from the permanent character file and insertion of the encoded input signal and the matrix into the message and display track is controlled by a marker track 24, which may parallel the message and display track on the storage drum. The comparator 18 provides an output to the marker track to indicate the address of the selected matrix. The marker track then controls operation of the gate 19 for reading this information from the file into the buffer storage unit 20. Similarly, a character interval control 25 provides an output to the marker track to indicate the position at which the next character is to be inserted. Ordinarily, this will be an advance of one character to the right of the preceding character. Then the marker track actuates the gate 15 to transfer the encoded signal in the buffer storage unit 14 to the message zone of the message and display track, and the gate 21 to transfer the matrix from the buffer storage unit 20 to the display zone of the message and display track. The insertion position may be varied by the right and left shift control 26 of the keyboard. The insertion position may also be controlled by a format code unit 27 which indicates that certain positions in the message form should remain blank. The format code is used when the message being composed must meet a prescribed form; the format code provides the required spacing between characters and prevents insertion of characters at improper locations. When the message composition is complete and is found satisfactory by visual inspection, gate 28 is actuated manually to transmit the encoded data from the message zone of the message and display track to the output line.

Figures 4, 5:
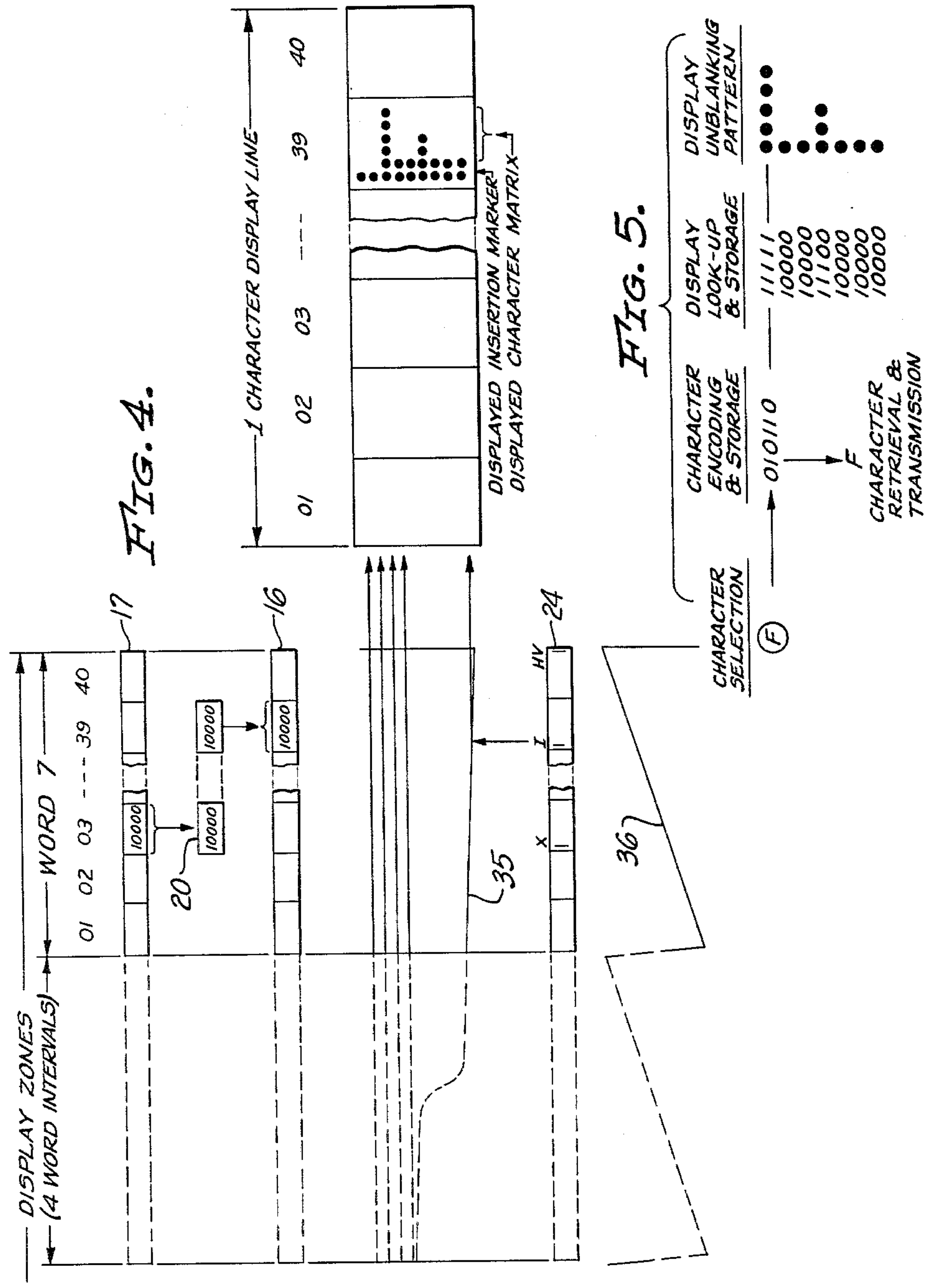
FIG. 5 is a diagram further illustrating the operation of the system.

The operating sequence of the system in handling the letter F is shown in the diagram of FIG. 5. The letter F is selected by depressing the F key of the keyboard 11. The encoder 13 converts the keyboard signal into a six-digit binary word 010110, which is stored in the message zone of the message and display track 16. A symbol matrix corresponding to this particular binary word is located in the permanent character file and is transferred to the display zones of the message and display track, the symbol matrix being indicated in FIG. 5 under the heading "Display Lookup and Storage." The Ones of this symbol matrix produce unblanking of the beam of the display tube while the Zeros leave the beam blank. Hence, the light spots on the display tube correspond exactly to the ones of the symbol matrix, producing the letter F on the display tube. The stored six-digit binary word is available for transmission on the output line, either as a six-digit binary word or in any other desired form into which the six-digit binary word can be converted.

Figure 3:
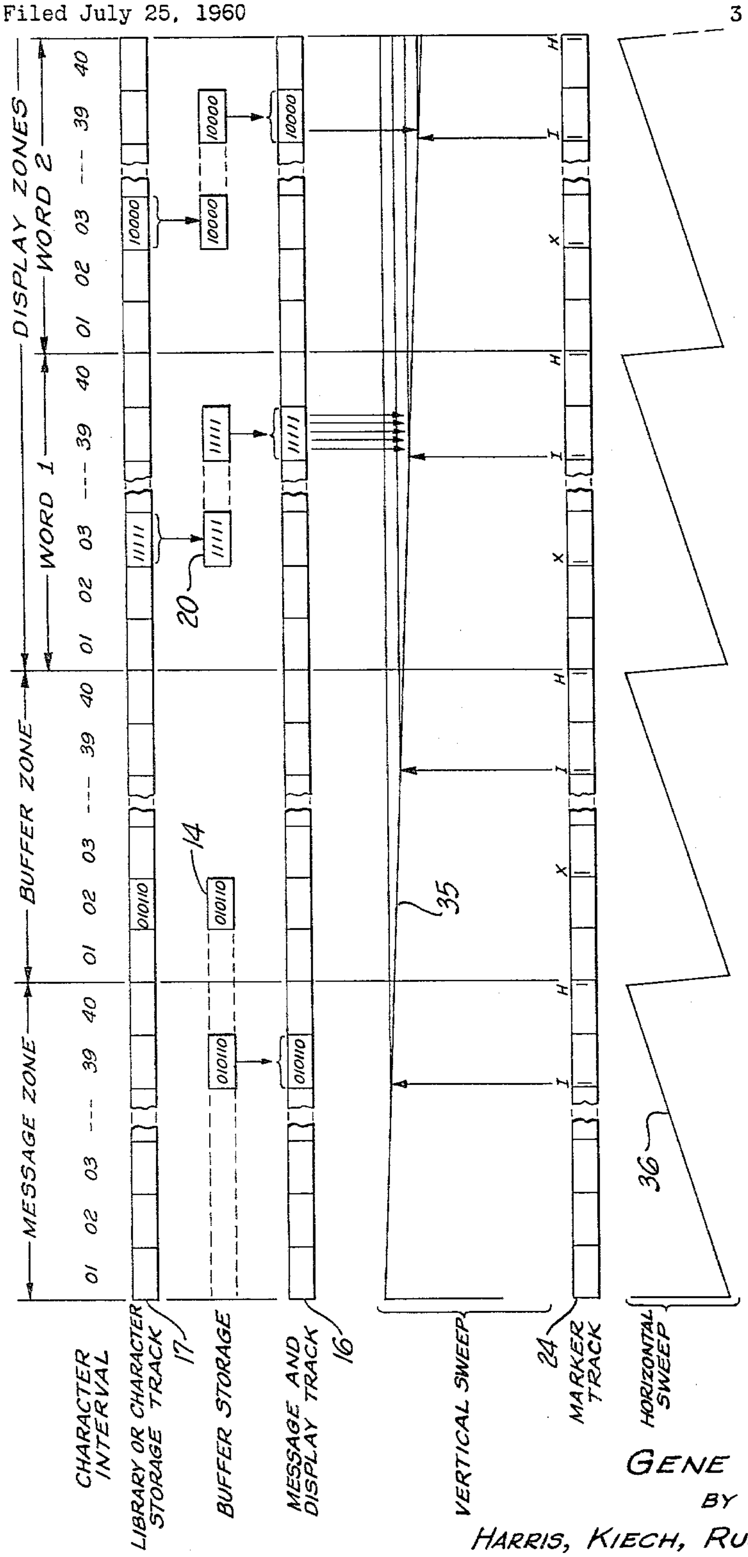
FIGS. 3 and 4 are two parts of a chart illustrating the operation of the system.

*FIGS. 3–4.—Detailed description*

FIGS. 3 and 4 illustrate the construction and operation of the system in greater detail. This embodiment discloses a system for a single line message having space for forty characters or symbols. Each symbol is formed by a 5 x 7 dot matrix. FIGS. 3 and 4 should be placed side by side with FIG. 3 to the left to produce the complete diagram. FIG. 3 and the left portion of FIG. 4 show the developed surface of the storage drum while the right portion of FIG. 4 shows the corresponding line on the display tube. The permanent character file may be contained on the storage drum and is shown as the library or character storage track. The library track, the message and display track, and the marker track are positioned parallel to each other and are divided into nine equal zones, viz, a message zone, a buffer zone, and seven display zones, corresponding to the seven vertical lines of the symbol matrix. Each zone is divided into forty character intervals corresponding to the forty characters of a display line. The storage drum is a conventional magnetic storage device having write and read heads for inserting and extracting the binary information into and out of the drum. The character intervals and the zones of the tracks may be defined by a conventional clock or timing track on the drum and the horizontal and vertical sweeps of the display tube are operated in synchronism with the drum as indicated in FIGS. 3 and 4.

Depressing one of the character keys of the keyboard 11 generates a signal which is fed into the encoder 13 which may be a conventional diode encoding matrix. The encoder generates a six-digit binary word which is stored in the buffer storage unit 14, the buffer storage preferably being a flip-flop register. The character interval control 25 inserts a character marker I in the marker track 24 at the beginning of the character interval at which the selected character is to be inserted in the display line. In the particular example given herein, the character F is to be inserted in the thirty-ninth character interval and this is indicated by the one at the beginning of the thirty-ninth interval in each zone of the marker track. The marker track may have a permanently stored marker at the end of each zone for synchronizing the horizontal and vertical sweeps, this marker being identified by H at the end of each zone and by V at the end of the track. The encoded letter 010110 is held in the storage unit 14 until the marker I appears and is transferred into the thirty-ninth interval of the message zone of the message and display track when the marker actuates the gate 15.

In addition to being recorded in the message zone of the message and display track 16, the binary word is also retained in the storage unit 14 for comparison with the symbol-identifying words of the library track 17 during the buffer zone time, this comparison being carried out in the comparator 18. When agreement is reached between the code in the buffer storage 14 and one of the codes in the library track, the storage position in the library of the corresponding symbol display matrix is established and an extraction marker X is recorded in the marker track 24 preceding the character interval in which the desired symbol matrix is to be extracted from the library track. During the first display zone, the first line of the symbol matrix is transferred from the library track 17 into the storage unit 20, the gate 19 being actuated by the extraction marker X. Then the matrix line is transferred from the storage unit 20 to the corresponding display zone of the message and display track 16, the gate 21 being actuated by the insertion marker I. After all the lines of the matrix are recorded in the display zones, the extraction marker and the insertion marker may be erased and a new insertion marker introduced at the next character interval as indicated by the character interval control 25.

FIGS. 3 and 4 illustrate the comparison and the ensuing seven-part transfer of matrix lines from the library track to the display track. Agreement between the encoded binary word in the buffer storage and one of the permanently recorded words in the buffer zone of the library track is indicated at the end of the character position 02, and the extraction marker X is recorded in the marker track in the first part of character position 03. During the ensuing seven word intervals of the display zone, the extraction marker causes matrix lines to be read out of character interval 03 of the library track and the insertion marker I later causes these lines to be written into character position 39 of the corresponding zones of the message and display track. When the insertion character interval precedes the extraction character interval within the word time, a one-word advance read head on the library track is utilized to provide the effect described in the preceding sentence. When the extraction and insertion character intervals are the same, the advance read head on the library track is used with the subsequent matrix line being shifted into the buffer register at the same time that the preceding matrix is being recorded.

During the readout of a display zone of the message and display track an unblanking signal is generated in response to each recorded One. During the readout a linear vertical sweep of the desired character height is generated for the display tube, and during each word interval or zone, a linear horizontal sweep of the desired line which is generated. As the recorded Ones are read out of the display zones of the display track, unblanking of the cathode beam occurs at the then existing level of the vertical sweep, resulting in superposition of the succeeding word zones of the display track to generate the character F as shown in the right part of FIG. 4. An insertion marker, indicated by the nine vertical dots preceding the F in FIG. 4 and corresponding to the insertion Ones (representative of insertion marker I) in the marker track, may be coupled to the beam unblanking unit 23 to provide a visual indication of the point of insertion of any character or symbol in the message. This insertion marker provides beam unblanking during the message zone and buffer zone and therefore stands out above the characters in a line of display for easy location. Of course, visual display of the insertion marker is not necessary to the invention.

The above-described operation may be repeated for each interval of the zone until a complete display line is obtained. The entire display line is stored in the message zone of the message and display track in the encoded binary form and is always available for transmission to an outgoing line. In normal operation, the line is typed by the operator at the keyboard. Then the line on the display tube is checked for errors. Errors are corrected by actuating the right or left shift 26 of the keyboard to shift the system to the appropriate insertion position and then the correct character or symbol is inserted. The correct message is then transmitted by actuating the gate 28. Additional lines of display can be obtained by providing additional message and display tracks and vertically shifting the vertical sweep to a new position on the display tube.

When the system of the invention is to be used for a specific application, one or more symbols or characters may be permanently stored in the message and display track so that the operator need only insert the variable data in the message with the fixed portion of the message already being present. To reduce the possibility for error, it is preferred to provide the format code unit 27 which actuates the character interval control 25 to prevent the operator from selecting an insertion position corresponding to one of the permanently inserted characters. For example, in an instrument for transmitting wind velocity and direction information, VEL may be permanently stored in the first three character intervals and DIR permanently stored in the seventh, eighth and ninth intervals, with the fourth, fifth and sixth intervals available for insertion of the velocity figure and the tenth and succeeding intervals available for insertion of the direction information. Then the format code unit would prevent access to the first, second, third, seventh, eighth and ninth intervals, causing the character interval control to advance to the fourth position when a new line was started and causing the control to advance to the tenth position after a character is inserted in the sixth position.

I should be noted that the keyboard 11 is not essential to the operation of the system and that any type of input unit which will provide information to the encoder 13 may be utilized. The input data may come from a remote location via a communication unit or may comprise the output of a computer or other system. Also, a combination of operator input and remote input may be used. This combination permits use of the system with a plurality of predetermined message forms. In such application, the permanent character portion of each message form is permanently stored in a suitable storage device. Then when a particular message form is desired, the data representing this particular form is coupled to the system as an input to transfer the form to the message and display track and the display tube. Then the operator proceeds to fill in the blanks in the form with appropriate symbols.

In one specific embodiment of the display system of the invention, eight lines of display characters are generated at a rate of thirty frames per second. The magnetic storage drum revolves at sixty revolutions per second and the entire display is generated in two drum revolutions. A twin beam cathode ray tube is used to write two lines simultaneously and the drum surface is organized so that two complete display lines are recorded per revolution. Thus during each drum revolution four lines of display characters are generated. The system as described and claimed herein utilizes a conventional cathode ray display with relatively short horizontal sweep time and relatively long vertical sweep time. It is understood that the relation of the horizontal and vertical sweeps can be interchanged and that other than rectangular coordinates can be used within the scope of the invention.

The specific embodiment referred to above utilizes a twelve inch diameter drum with 5040 bits of information stored per revolution at a storage density of 134 bits per inch to provide an information rate of 302.4 kilocycles per second.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a message display system, the combination of: a source of input data in binary word form; a storage drum having a display track with a message zone and a plurality of display zones, with said message zone providing for storing the binary words; message transmission means for transmitting the binary words from said message zone to an output line; a cathode ray display tube; means for sweeping the cathode beam horizontally and vertically; means for controlling the intensity of the beam; a symbol storage having a plurality of symbols stored therein, with each stored symbol having a rectangular coordinate matrix of ones and zeros which pictorially defines the symbol, and with each stored symbol having a corresponding binary word; means for comparing an input binary word with the symbol storage binary words to select a particular symbol matrix; means for transferring the selected symbol matrix to the display zones of said display track of said storage drum; means for connecting the display zones of said display track to said beam intensity control for displaying the selected symbol on said tube; and means for actuating said message transmission means to transmit the data from said message storage zone.

2. In a message display system, the combination of: a source of input data in binary word form; a storage drum having a display track and a symbol storage track, said display track having a message zone and a plurality of display zones, with said message zone providing for storing the binary words, and said symbol storage track having a plurality of symbols stored therein, with each stored symbol having a rectangular coordinate matrix of ones and zeros which pictorially defines the symbol, and with each stored symbol having a corresponding binary word; message transmission means for transmitting the binary words from said message zone to an output line; a cathode ray display tube; means for sweeping the cathode beam horizontally and vertically; means for controlling the intensity of the beam; means for comparing an input binary word with the symbol storage binary words to select a particular symbol matrix; means for transferring the selected symbol matrix to the display zones of said display track of said storage drum; means for connecting the display zones of said display track to said beam intensity control for displaying the selected symbol on said tube; and means for actuating said message transmission means to transmit the data from said message storage zone.

3. In a message display system, the combination of: a source of input data in binary word form; a symbol storage having a plurality of symbols stored therein, with each stored symbol having a rectangular coordinate matrix of ones and zeros which pictorially defines the symbol, and with each stored symbol having a corresponding binary word; a storage drum having a display track with a plurality of display zones, with each display zone corresponding to a line of the symbol matrix, and with each zone having a plurality of symbol positions corresponding to a line of visual display; message storage means for storing the binary words; message transmission means for transmitting the binary words from said message storage means to an output line; a display tube; means for sweeping the display tube horizontally and vertically; means for controlling the intensity of the display beam; means for comparing an input binary word with the symbol storage binary words to select a particular symbol matrix; means for transferring the matrix lines of the selected symbol matrix to a particular symbol position in each corresponding display zone of said storage drum; and means for connecting the display track to said beam intensity control for displaying the selected symbol on said tube, with said beam sweeping means in synchronism with said drum so that the matrix lines of each zone of each symbol position are displayed in alignment to form the symbol.

4. In a message display system, the combination of: a source of input data in binary word form; message storage means for storing the binary words; a visual display unit; control means for actuating said display unit to display a pattern thereon; a symbol storage having a plurality of symbols stored therein, with each stored symbol having a pattern of ones and zeros which pictorially defines the symbol, and with each stored symbol having a corresponding binary word; a storage drum having a display track and a marker track, said display track having a plurality of display zones, with each zone having a plurality of symbol positions corresponding to a line of visual display, and with each display zone corresponding to a line of the symbol matrix, said marker track having corresponding zones and symbol positions; means for introducing an insertion marker into a selected symbol position of each zone of said marker track; means for comparing an input binary word with the symbol storage binary words to select a particular symbol pattern; means for transferring the selected symbol pattern to the display zones of said display track at the symbol positions indicated by said insertion markers of said storage drum; and means for connecting the display track to said visual display unit for displaying the selected pattern.

5. In a message display system, the combination of: a source of input data in binary word form; a symbol storage having a plurality of symbols stored therein, with each stored symbol having a rectangular coordinate matrix of ones and zeroes which pictorially defines the symbol, and with each stored symbol having a corresponding binary word; a storage drum having a display track with a plurality of display zones, with each display zone corresponding to a line of the symbol matrix, and with each zone having a plurality of symbol positions corresponding to a line of visual display; message storage means for storing the binary words; message transmission means for transmitting the binary words from said message storage means to an output line; a display tube; means for sweeping the display tube horizontally and vertically; means for controlling the intensity of the display beam; means for comparing an input binary word with the symbol storage binary words to select a particular symbol matrix; means for transferring the matrix lines of the selected symbol matrix to the same symbol positions in each corresponding zone of said storage drum; means for setting the symbol position in the display zones to which the matrix lines are transferred, said means being variable to select any desired symbol position; and means for connecting the display track to said beam intensity control for displaying the selected symbol on said tube, with said beam sweeping means in synchronism with said drum so that the matrix lines of each zone of each symbol position are displayed in alignment to form the symbol.

6. In a message display system, the combination of: a source of input data in binary word form; a symbol storage having a plurality of symbols stored therein, with each stored symbol having a rectangular coordinate matrix of ones and zeros which pictorially defines the symbol, and with each stored symbol having a corresponding binary word; a storage drum having display track and a marker track, said display track having a message zone and a plurality of display zones, with each zone having a plurality of symbol positions corresponding to a line of visual display, and with each display zone corresponding to a line of the symbol matrix, and with each symbol position of said message zone providing for storing a binary word, said marker track having corresponding zones and symbol positions; and means for introducing an insertion marker into a selected symbol position of each zone of said marker track; means for connecting the binary word from said source to the symbol position of said message zone of said display track corresponding to the location of the insertion marker in said marker track; a display tube; means for sweeping the display tube beam horizontally and vertically; means for controlling the intensity of the display beam; means for comparing an input binary word with the symbol storage binary words to select a particular symbol matrix; means for transferring the matrix lines of the selected symbol matrix to the display zones of said display track of said storage drum at the symbol positions indicated by said insertion markers; and means for connecting the display track to said beam intensity control for displaying the selected symbol on said tube.

7. In a message display system, the combination of: a source of input data in binary word form; a storage drum having a display track, a symbol storage track, and a marker track, said symbol storage track having a plurality of symbols stored therein, with each stored symbol having a rectangular coordinate matrix of ones and zeros which pictorially defines the symbol, and with each stored symbol having a corresponding binary word, said display track having a message zone and a plurality of display zones, with each zone having a plurality of symbol positions corresponding to a line of visual display, and with each display zone corresponding to a line of the symbol matrix, and with each symbol position of said message zone providing for storing a binary word, said marker track having corresponding zones and symbol positions; means for introducing an insertion marker into a first selected symbol position of each zone of said marker track; means for connecting the binary word from said source to the symbol position of said message zone of said display track corresponding to the location of the insertion marker in said marker track; a display tube; means for sweeping the display tube beam horizontally and vertically; means for controlling the intensity of the display beam; means for comparing an input binary word with the symbol storage binary words to select a particular symbol matrix; means for introducing an extraction marker into a second selected symbol position of each display zone of said marker track corresponding to the location of the selected symbol matrix in said symbol storage track; means actuated by said extraction markers for transferring the matrix lines of the selected symbol matrix from said symbol storage track to the display zones of said display track of said storage drum at the symbol positions indicated by said insertion markers; and means for connecting the display track to said beam intensity control for displaying the selected symbol on said tube.

8. In a message display system, the combination of: a source of input data in binary word form; a symbol storage having a plurality of symbols stored therein, with each stored symbol having a rectangular coordinate matrix of ones and zeros which pictorially defines the symbol, and with each stored symbol having a corresponding binary word; a storage drum having a display track with a plurality of symbol positions; message storage means having a corresponding plurality of symbol positions for storing binary words; control means for selecting a particular symbol position for said display track and said message storage means; message transmission means for transmitting the binary words from said message storage means to an output line; a cathode ray display tube; means for sweeping the cathode beam horizontally and vertically; means for controlling the intensity of the beam; means for comparing an input binary word with the symbol storage binary words to select a particular symbol matrix; means for transferring the selected symbol matrix to the selected symbol position of said display track of said storage drum; format code means coupled to said control means in actuating relation for blocking storage of binary words and transfer of symbol matrices to preselected symbol positions; and means for connecting the display track to said beam intensity control for displaying the selected symbol on said tube.

9. In a message display system, the combination of: a source of input data in binary word form; a storage drum having a display track with a message zone and a plurality of display zones, with said message zone providing for storing the binary words in predetermined intervals independently of the order of the incoming data, with said message and display zones having corresponding storage intervals; message transmission means for sequentially transmitting the binary words from said message zone to an output line; a cathode ray display tube; means for sweeping the cathode beam horizontally and vertically; means for controlling the intensity of the beam; a symbol storage having a plurality of symbols stored therein, with each stored symbol having a rectangular coordinate matrix of ones and zeros which pictorially defines the symbol, and with each stored symbol having a corresponding binary word; means for comparing an input binary word with the symbol storage binary words to select a particular symbol matrix; means for transferring the selected symbol matrix to the intervals of the display zones of said display track of said storage drum corresponding to the interval of the message zone in which is stored the binary word compared with the selected symbol; means for connecting the display zones of said display track to said beam intensity control for displaying the selected symbol on said tube; and means for actuating said message transmission means to transmit the data from said message storage zone.

10. In a message display system, the combination of:

a source of input data in binary word form;

message storage means for storing the binary words;

a visual display unit;

control means for actuating said display unit to display a pattern thereon;

a symbol storage having a plurality of symbols stored therein, with each stored symbol having a pattern of ones and zeroes which pictorially defines the symbol, and with each stored symbol having a corresponding binary word;

a storage drum having a display track and a marker track, said display track having a plurality of display zones, with each zone having a plurality of symbol positions corresponding to a line of visual display, and with each display zone corresponding to a line of the symbol matrix, said marker track having corresponding zones and symbol positions;

means for introducing an insertion marker into a selected symbol position of each zone of said marker track;

an intermediate storage unit;

means for comparing an input binary word with the symbol storage binary words to select a particular symbol pattern for transfer to said intermediate storage unit;

means for transferring the selected symbol pattern from said intermediate storage unit to the display zones of said display track of said storage drum at the symbol positions indicated by said insertion markers; and means for connecting the display track to said visual display unit for displaying the selected pattern.

References Cited by the Examiner

UNITED STATES PATENTS

| | | | |
|---|---|---|---|
| 2,594,731 | 4/1952 | Connolly | 340—318 |
| 2,721,990 | 10/1955 | McNaney | 340—324.1 |
| 2,875,951 | 3/1959 | Schreimer | 340—324.1 |
| 3,037,192 | 5/1962 | Everett | 340—172.5 |

OTHER REFERENCES

"Faster, Faster" by Eckert et al., McGraw-Hill Book Co., 1955, pages 84 and 85.

ROBERT C. BAILEY, *Primary Examiner.*

IRVING L. SRAGOW, MALCOLM A. MORRISON, *Examiners.*